(12) United States Patent
Lee et al.

(10) Patent No.: US 7,067,211 B2
(45) Date of Patent: *Jun. 27, 2006

(54) COGENERATION SYSTEM FOR A FUEL CELL

(75) Inventors: James H. Lee, Rochester, NY (US); James S. Siepierski, Williamsville, NY (US); George R. Woody, Wiesbaden (DE)

(73) Assignee: General Motors Corporation, Detroit, MI (US)

( * ) Notice: Subject to any disclaimer, the term of this patent is extended or adjusted under 35 U.S.C. 154(b) by 43 days.

This patent is subject to a terminal disclaimer.

(21) Appl. No.: 10/005,000

(22) Filed: Dec. 7, 2001

(65) Prior Publication Data

US 2002/0055025 A1 May 9, 2002

Related U.S. Application Data

(62) Division of application No. 09/469,800, filed on Dec. 22, 1999, now Pat. No. 6,365,289.

(51) Int. Cl.
*H01M 8/00* (2006.01)

(52) U.S. Cl. .................... 429/20; 429/17; 429/26; 417/65

(58) Field of Classification Search .............. 429/13, 429/26, 17, 20, 120; 417/65; 252/77, 78.1, 252/75, 73, 70, 7; 62/7, 112, 114, 533, 536, 62/537

See application file for complete search history.

(56) References Cited

U.S. PATENT DOCUMENTS

| | | | | |
|---|---|---|---|---|
| 3,968,999 A | * | 7/1976 | Keller | 406/197 |
| 3,982,962 A | * | 9/1976 | Bloomfield | 429/19 |
| 4,431,714 A | * | 2/1984 | Myerhoff | 429/26 |
| 4,820,594 A | * | 4/1989 | Sugita et al. | 429/17 |
| 5,938,975 A | * | 8/1999 | Ennis et al. | 252/373 |
| 6,348,278 B1 | * | 2/2002 | LaPierre et al. | 429/17 |

* cited by examiner

*Primary Examiner*—Raymond Alejandro
(74) *Attorney, Agent, or Firm*—Cary W. Brooks

(57) ABSTRACT

A fuel cell system and process using an organic Rankine cycle to produce shaft work to operate a fuel cell system component such as an air compressor. The air compressor delivers compressed air to a fuel cell stack. The steps of the Rankine cycle include pumping a liquid working fluid to an elevated pressure, heating the fluid to a gas, expanding the high temperature and high-pressure gas through an expander to produce shaft work used to drive a fuel cell system component such as an air compressor, and then removing energy from the cooling fluid to change the gas back to a liquid, and repeating the cycle. The liquid fluid can be heated by an external boiler, or one of the components of the fuel cell system such as the combustor and/or the fuel cell stack.

9 Claims, 2 Drawing Sheets

COGENERATION SYSTEM FOR A FUEL CELL

This is a division of application Ser. No. 09/469,800 filed on Dec. 22, 1999 now U.S. Pat. No. 6,365,289.

TECHNICAL FIELD

This invention relates to a fuel cell system having a component that utilizes shaft work.

BACKGROUND OF THE INVENTION

Alexander Grove invented the first fuel cell in 1839. Since then most of the fuel cell development has been primarily limited to applications supported by the government such as the United States National Aeronautics and Space Administration (NASA), or in utility plants. However, recent developments in materials of construction and processing techniques have brought fuel cell development closer to significant commercial applications. A primary advantage of fuel cells is that fuel cells can convert stored energy to electricity with about 60–70 percent efficiency, with higher efficiencies theoretically possible. Further, fuel cells produce virtually no pollution. These advantages make fuel cells particularly suitable for vehicle propulsion applications and make fuel cells a potential replacement for the internal combustion engine which operates at a less than 30 percent efficiency and can produce undesirable emissions.

A fuel cell principally operates by oxidizing an element, compound or molecule (that is, chemically combining with oxygen) to release electrical and thermal energy. Thus, fuel cells operate by the simple chemical reaction between two materials such as a fuel and an oxidant. Today, there are variety of fuel cell operating designs that use many different fuel and oxidant combinations. However, the most common fuel/oxidant combination is hydrogen and oxygen (usually in the form of air).

In a typical fuel cell, hydrogen is burned by reacting the hydrogen with oxygen from air to produce water, electrical energy and heat. This is accomplished by feeding the hydrogen over a first electrode (anode), and feeding the oxygen over a second electrode (cathode). The two electrodes are separated by an electrolyte which is a material that allows charged molecules or "ions" to move through the electrolyte. There are several different types of electrolytes that can be utilized including the acid-type, alkaline-type, molten-carbonate-type and solid-oxide-type. The so-called PEM (proton exchange membrane) electrolyte (also known as a solid polymer electrolyte) is an acid-type, and potentially has high-power and low-voltage, and thus are desirable for vehicle applications.

Although compressed or liquefied hydrogen could be used to operate a fuel cell in a vehicle, to date this is not practical. The use of compressed or liquefied hydrogen ignores the extensive supply infrastructure currently being used to supplying gasoline for internal combustion engine automobiles and trucks. Consequently, it is more desirable to utilize a fuel source such as methanol or gasoline to provide a hydrogen source for the fuel cell. However, the methanol or gasoline must be reformed to provide a hydrogen gas source. This is accomplished by using methanol or gasoline fuel processing equipment and hydrogen cleanup or purification equipment.

Fuel cell systems often include a fuel processing section which reforms a fuel, preferably an organic based fuel such as methanol or gasoline, to produce hydrogen and a variety of other byproducts. However, these reforming processes are endothermic and require energy input to drive the reforming reaction. This energy input and the breakdown of the fuel during the reforming process increases the pressure of the reformer exhaust. As a result, after the hydrogen stream exits the reformer and when it is delivered to the fuel cell, the hydrogen stream is under pressure at about 3 bars.

Consequently, both sides of the above described fuel cell membrane must have the same pressure. Otherwise, the membrane would flex back and forth, and the catalyst on the membrane that is used to reduce hydrogen molecules would be damaged resulting in poor performance or failure of the system. Thus the oxidant or air being supplied to the fuel cell stack must be compressed to the same pressure as the hydrogen stream.

Additionally, other fuel cell processing components such as preferential oxidation reactors may require compressed air to operate. These compressed air requirements are a significant drain on the fuel cell system. Approximately 10 percent of the power generated by the fuel cell stack goes back into compressing air under most of the current fuel cell systems. Thus it would be desirable to develop a system which reduced the amount of electricity utilized to run air compressors in a fuel cell system.

The present invention provides alternatives to and advantages over the prior art.

SUMMARY OF THE INVENTION

The invention includes a fuel cell system and process using a Rankine cycle to produce shaft work to operate a fuel cell system component. The shaft work may be used to drive an air compressor to deliver compressed air to a fuel cell system component. The steps of the Rankine cycle include pumping a liquid working fluid to an elevated pressure, heating the fluid to a gaseous state, expanding the high temperature and high-pressure gas through expander to produce shaft work used to drive a fuel cell system component such as an air compressor, and then removing energy from the cooling fluid gas to change the gas back to a liquid, and repeating the cycle. The liquid fluid can be heated by an external boiler, or one of the components of the fuel cell system such as a combustor or the fuel cell stack.

In a preferred embodiment, the invention includes a fuel cell system and process that utilizes a fuel cell to co-generate electricity and shaft work. The system utilizes waste thermal energy, generated by a fuel cell stack, to produce shaft work that can be used to drive an air compressor. The air compressor compresses process air needed by the fuel cell stack or other fuel cell system components. To accomplish these tasks a Rankine cycle is used in the cooling system of the fuel cell stack to recover the waste thermal energy.

In comparison to traditional methods of cooling the fuel cell stack, the present invention allows for a reduction in the ancillary power equipment, a decrease in the size of the cooling system, and a method of the heating the stack in cold start conditions. The system converts the low-grade thermal energy produced by the fuel cell stack to shaft work, and then uses the shaft work to compress and move process air needed by the fuel cell stack. As a result, the electrical motor used to compress process air in conventional systems is displaced, and the size of the stack can be reduced because the electricity requirement of the conventional air compressor it is eliminated. The size of the cooling system is reduced by the amount of energy converted to shaft work. The net result of these two features is a reduction in the size of cooling system radiators, a concern with conventional cooling systems.

Another benefit of the present invention is that the system may be used heat the fuel cell stack in cold start conditions. The system directs the coolant through a supplemental boiler/super heater when the system is below a predetermined temperature. The supplemental boiler/super heater heats the cooling fluid which in turn heats the fuel cell stack. This greatly reduces the startup time of the system.

These and other objects, features and advantages of present invention will become apparent from the following brief description of drawings, detailed description of preferred embodiments, and appended claims and drawings.

DESCRIPTION OF PREFERRED EMBODIMENTS

Figure 1:
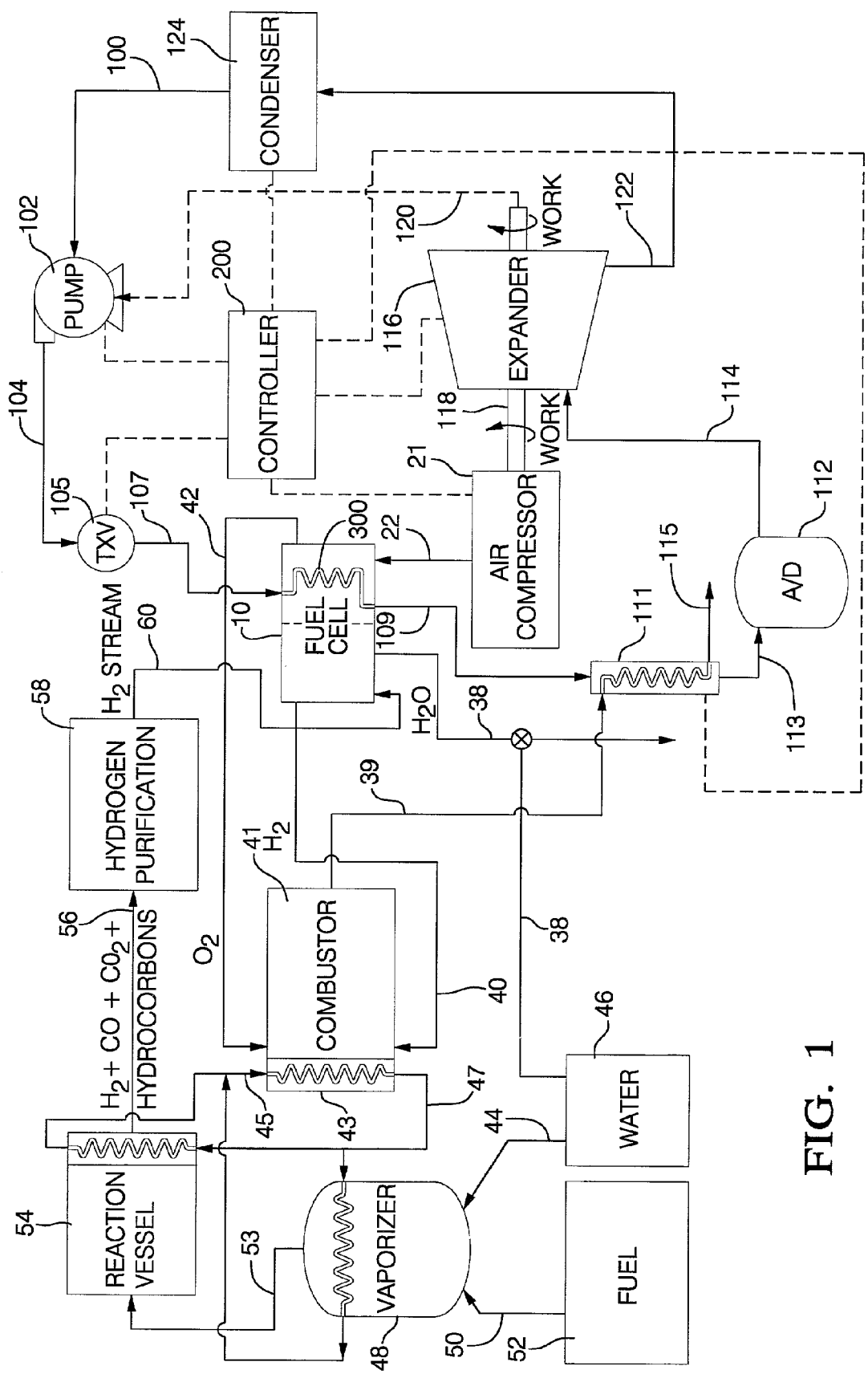
FIG. 1 is a schematic illustration of a fuel cell system and process flow according to the present invention.

FIG. 1 illustrates a fuel cell process, system and components useful in the present invention. A water stream 44 from a water source such as a water reservoir or holding tank 46 is supplied to a vaporizer 48. A fuel stream 50 from a fuel holding tank 52 is also delivered to the vaporizer 48. Preferably the fuel stream 50 is an organic based fuel such as methanol or gasoline. The fuel and water are vaporized together and a resulting vaporized fuel/water stream 53 is delivered to a reaction vessel 54, which may in this case be used to perform a fuel reformation process.

Of course the present invention can be utilized with a variety of different systems besides the fuel reformation process described hereafter. The present invention can be utilized in any system that delivers a fuel to a fuel cell stack for conversion into electricity. For example, the present invention can be utilized with a pure hydrogen system. In such a case, the fuel and water tanks 52, 56, vaporizer 48, reaction vessel 54 and hydrogen purification section 58 shown in FIG. 1 may be eliminated. It may be desirable to utilize the combustor 41 even with a pure hydrogen system. Pure hydrogen can be delivered to the combustor, from a suitable source such as a liquid hydrogen tank, and combusted therein to provide startup heat. Alternatively, anode exhaust from the fuel cell stack may be delivered to the combustor to produce heat at startup of the fuel cell system. In another alternative embodiment, an electrical motor may be utilized to startup the pump 102 and/or air compressor 21. The following detailed description of a fuel reformation process is only one of many embodiments contemplated as useful with the present invention.

The reformation process effluent stream 56 may contain hydrogen molecules ($H_2$), CO, $CO_2$ and hydrocarbons (or organic based molecules). The reforming process effluent stream 56 may be delivered to a hydrogen purification section 58 to reduce the concentration of CO and/or hydrocarbons. The hydrogen purification section 58 may include any of a variety of components for purifying the reformation process effluent stream 56. These purification components may include preferential oxidation reactors, reactors to shift the equilibrium of the stream 56 constituents (thus reducing the concentration of CO), additional hydrocarbon reforming components, separators, adsorbers and similar equipment. Eventually, a hydrogen rich stream 60 is delivered to the fuel cell stack 10. Fuel cell stacks useful in the present invention are known to those skilled in the art, and for example, one such fuel cell is disclosed in the Assignee's co-pending patent application entitled "Multiple Stage Combustion Process to Maintain a Uniform Reformation Temperature Profile" by William H. Pettit, Attorney Docket number H-203484, the disclosure of which is hereby incorporated by reference.

Both hydrogen 60 and oxygen 22 (in the form of air) are supplied to the fuel cell 10 in excess to provide the greatest rate of reaction possible. The hydrogen gas stream 60 will usually be under pressure of about 3 bars ($3 \times 10^5$ newtons per square inch or almost 3 atmosphere) if it is produce from a hydrocarbon reformation reaction (although the system may use other pressures). Therefore the oxygen stream 22 must be compressed (pumped up) to the same pressure to avoid damage to the fuel cell proton exchange membrane and the catalyst thereon. To accomplish this, an air compressor 21 is utilized. An excess oxygen stream 42 and excess hydrogen stream 40 (effluent or tail gas) from the fuel cell stack 10 may each be delivered to a combustor 41. A heat exchanger 43 may be connected to the combustor 41 and may include lines 45, 47 to transfer heat to a variety of components such as the reaction vessel 54 and vaporizer 48. Excess water from the fuel cell may be discharged to the atmosphere or delivered via line 38 to the water holding tank 46.

As described earlier, traditional fuel cell systems utilized a substantial amount of electricity to run the air compressor needed to supply compressed air 22 to the fuel cell stack 10. The present invention utilizes a Rankine cycle to recover waste thermal energy generated by the fuel cell stack 10 and to generate shaft work to drive a fuel cell system component such as the air compressor 21 as described hereafter.

A Rankine cycle as used in the present invention starts by delivering a relatively low pressure, low temperature cooling (working) fluid stream via line 100 to a pump 102 that increases the pressure of the cooling fluid. Any of a variety of cooling fluids suitable for a Rankine cycle under the operating condition of a fuel cell system are contemplated. A suitable cooling fluid should not freeze or boil in the vehicle environmental exposure temperature range of −25 to 125 degrees Celsius. Further, a suitable cooling fluid produces a substantial amount of work under the operating conditions of the vehicle and the Rankine cycle. Many organic cooling fluids meet both of these requirements. For example, a suitable the cooling fluid is R114 ($CClF_2CClF_2$).

The high-pressure cooling fluid stream leaves the pump 102 via line 104 and is delivered to a thermostatic valve (TXV) 105. The thermostatic valve 105 varies the cooling fluid flow rate to ensure that the fuel cell stack temperature remains within a predetermined operating range, usually between 75–85 degrees Celsius during the post startup operation. The high-pressure cooling fluid is delivered via line 107 to a fuel cell stack cooling mechanism 300 which typically includes a manifold connected to the bipolar plates of the fuel cell stack 10. A serpentine cooling fluid flow path is provided through the center of each bipolar plate (also not shown) where, during the startup phase, the cooling fluid actually warms up the fuel stack components and reactants. A typical fuel cell stack cooling mechanism is disclosed in Spear Jr., et al U.S. Pat. No. 5,863,671, issued Jan. 26, 1999, the disclosure of which is hereby incorporated by reference. The high-pressure cooling fluid is then delivered from the fuel cell stack 10 via line 109 to a supplemental boiler/super heater 111. Preferably, the supplemental boiler/super heater 111 is a heat exchanger that utilizes the combustion exhaust 39 from a combustor 41 to heat the cooling fluid both during startup and post startup operation. After exiting the supplemental boiler/super heater 111 the combustion exhaust may be discharged to the atmosphere via line 115. After the cooling fluid is heated by the supplemental boiler/super heater 111, the cooling fluid is delivered down stream via line 113 to an accumulator/dehydrator (A/D) 112. The accumulator/dehydrator 112 separates the gaseous coolant from its liquid. The accumulator/dehydrator 112 also acts a refrigerant reservoir, has charging connections, works as a buffer to smooth out transient changes due to load variations, and has a desiccant to absorb any moisture present so as to prevent damage to the fuel cell stack 10 under freezing conditions.

The gaseous cooling fluid exits the accumulator/dehydrator 112 via line 114 and is delivered to an expander 116 that expands the high temperature, high pressure fluid to produce shaft work. A shaft connection 118 couples the expander 116 and the air compressor 21 together so that the shaft work produced by the expander 116 drives the air compressor 21. The high temperature, low pressure gaseous cooling fluid exits the expander 116 via line 122 and enters a condenser/heat exchanger 124 that condenses the cooling fluid vapor to a liquid. However, during startup conditions, fans in the condenser/heat exchanger 124 are not turned on so that the cooling fluid remains warm. After the fuel cell stack 10 has reached a predetermined temperature suitable for post startup operation, fans in the condenser/heat exchanger 124 are turned on to condense the cooling fluid gas to a liquid. The heat removed from the high temperature, low pressure cooling fluid by the condenser or heat exchanger 124 may be utilized to pre-heat the fuel before the fuel enters the reaction vessel 54. The low pressure, low temperature cooling fluid exits the condenser 124 via line 100 to the pump 102 to start the cycle over again.

Under some operating conditions, the fuel cell stack 10 may not produce sufficient waste heat to completely vaporize all of the cooling fluid. In this case, the supplemental boiler/super heater 111 provides additional heat to completely vaporize all of the cooling fluid liquid, and preferably provides sufficient heat to super heat the cooling fluid gas to an elevated temperature. As indicated earlier, an electrical motor may be utilized to drive the pump 102 and/or air compressor 21 during startup.

Referring again to FIG. 1, in a manner known to those skilled in the art, a controller 200 may be provided and may include a master processing unit, sub-processing unit, ROM, RAM, input/output unit processing unit (not shown). The controller 200 may be in communication with and operatively connected to various components of the fuel cell system including the pump 102, thermostatic expansion valve 105, expander 116, air compressor 21, condenser 124 and actuators, drivers and sensors (not shown) for the same to control these components based upon input signals corresponding to monitored process conditions.

Figure 2:
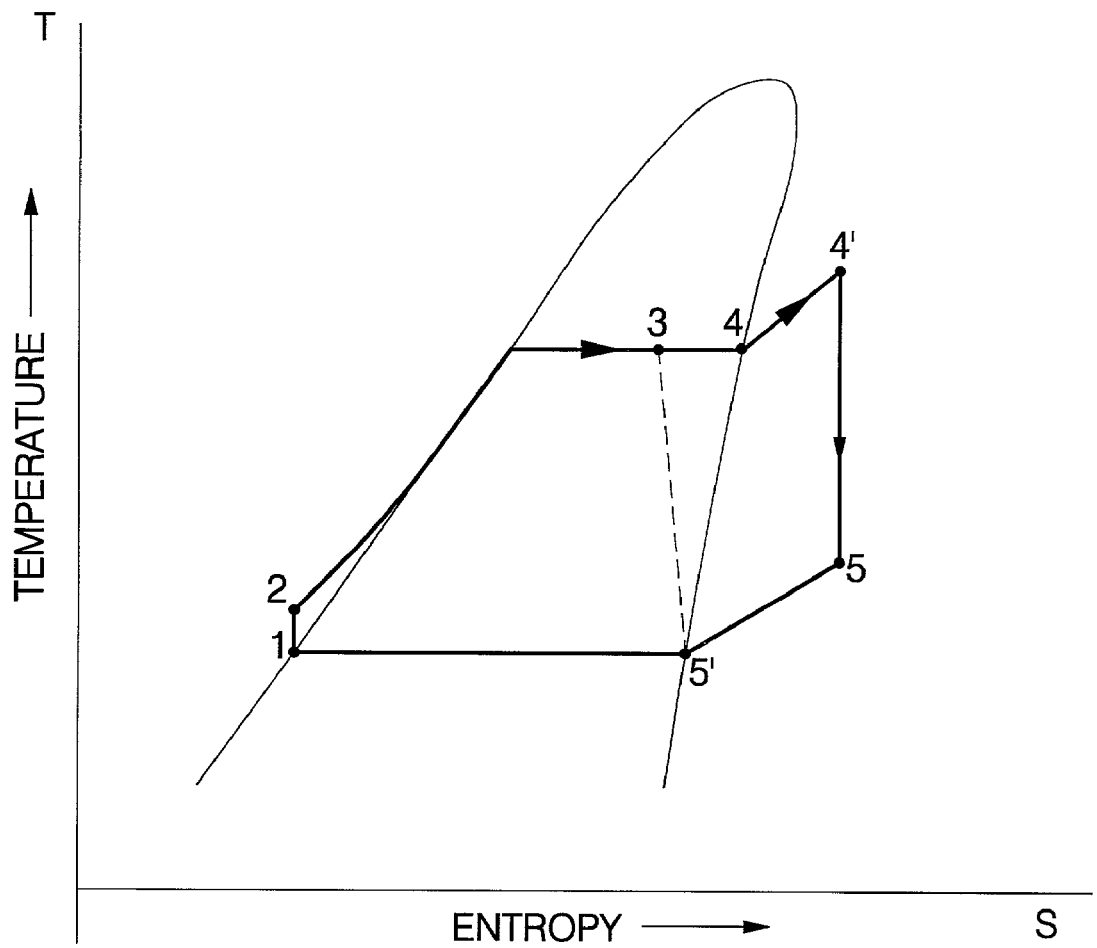
FIG. 2 is a temperature vs. entropy diagram for the two phase thermal management system according to present invention.

FIG. 2 is a temperature-entropy phase diagram for a cooling fluid undergoing an organic Rankine cycle according to the present invention. The Rankine cycle during post startup operating conditions consists of the following process steps: 1) the reversible adiabatic pumping process in the pump 102 is represented by points 1–2 on the phase diagram; 2) the constant pressure transfer of heat from the fuel cell stack 10 to the cooling fluid which is not completely vaporized is represented by points 2–3 on the phase diagram; 3) the constant pressure transfer of heat from the supplemental boiler/super heater 111 to completely vaporize all of the cooling fluid liquid is represented by points 3–4 on the phase diagram; 4) the super heating of the cooling fluid gas, by super heater 111, to an elevated temperature is represented by points 4–4' on the phase diagram; 5) the reversible adiabatic expansion of the cooling fluid gas in the expander/turbine 116 is represented by points 4'–5 on the phase diagram; and 6) the constant pressure transfer of heat from the cooling fluid gas in the condenser 124 to convert the gas to liquid is represented by points 5–5'–1 on the phase diagram. The shaft work produced by the expander/turbine 116 is a difference in the enthalpy (enthalpy is not shown in FIG. 2) of the cooling fluid at points 4' and 5. The shaft work produced is greater than the work (difference in the enthalpy between points 1–2) required to pump the liquid cooling fluid to an elevated pressure. A substantial portion of the heat input to vaporize the cooling fluid liquid is waste heat from the fuel cell stack 10. As a result, net work is produced by incorporating a Rankine cycle in a fuel cell system.

Referring again to FIG. 2, during startup conditions the cycle includes the following steps: 1) the reversible adiabatic pumping process of the liquid in the pump 102 is represented by points 1–2 on the phase diagram; 2) the constant pressure transfer of heat from the heat exchanger supplemental boiler/super heater 111 to vaporize at least a portion of the liquid and provide a saturated liquid is represented by points 2–3 on the phase diagram; 4) the expansion of the cooling fluid in the expander/turbine 116 is represented by the dotted line between points 3–5'; and 5) the transfer of heat from the vapor to warm up the fuel cell stack 10 is represented by points 5'–1. The use of an organic Rankine cycle at startup allows for the saturated liquid to be expanded to a dry saturated vapor. This allows for the cold startup two-phase expansion to be completed to dry exhaust without producing condensation that can be damaging to the expander/turbine.

The present invention provides advantages over the prior art and particularly over prior art systems using other methods for cooling the fuel cell stack. These advantages include the reduction in auxiliary power requirements, a decrease in the size of cooling system, and a means for heating the fuel cell stack in cold startup conditions. The present invention converts the low-grade thermal energy produced by the fuel cell stack to shaft work, and then uses the shaft work to compress and move process air. As a result, the electrical motor used to compressed process air in conventional systems is displaced, and the size of the fuel cell stack can therefore be reduced. The size of the cooling system is also reduced by the amount of energy converted to shaft work. The net result of these features is the reduction in the size of the cooling system, a common concern with conventional cooling systems.

The invention claimed is:
1. A process comprising:
circulating a working fluid through a first flow path, wherein the working fluid comprises molecules comprising carbon;
pumping the working fluid in liquid form to an elevated pressure;
flowing the working fluid through the center of a bipolar plate in a fuel cell stack;
heating the working fluid to a high temperature and high-pressure gas;
expanding the high temperature and high-pressure gas through an expander to produce shaft work;
using the shaft work to drive an air compressor for compressing air and delivering compressed air to a fuel cell subcomponent;
and removing energy from the gas to change the gas to the working fluid in liquid form;

and flowing hydrogen through a second flow path including the fuel cell stack to generate electricity using the hydrogen, and wherein the first flow path does not include a steam reforming reactor to reform the working fluid.

2. A process as set forth in claim 1 further comprising using the shaft work to drive a pump for pressuring and delivering cooling fluid to a fuel cell component.

3. A process as set forth in claim 1 wherein the working fluid comprises $CClF_2CClF_2$.

4. A process as set forth in claim 1 wherein the molecules further comprise a halide.

5. A process as set forth in claim 1 wherein the first flow path and the second flow path do not share a common portion.

6. A process of heating a fuel cell stack during relatively cold startup conditions comprising:
  (a) pumping a fuel cell stack liquid cooling fluid to an elevated pressure, and wherein the liquid cooling fluid comprises molecules comprising carbon;
  (b) flowing the liquid cooling fluid through the center of a bipolar plate in a fuel cell stack thereby transferring thermal energy between the fuel cell stack liquid cooling fluid and a fuel cell stack;
  (c) heating the liquid cooling fluid;
  (d) immediately thereafter expanding the heated cooling fluid in an expander to produce shaft work;
  (e) using the shaft work to drive an air compressor for compressing air and delivering compressed air to the fuel cell stack;
  (f) directing the cooling fluid through a condenser comprising fans and wherein the condenser fans are turned off, and
  (g) repeating steps (a–f) until the temperature of a fuel cell stack has reached a predetermined temperature suitable for operating the fuel cell stack under cross-startup operating conditions.

7. A process as set forth in claim 6 further comprising using the shaft work to drive a pump for pressurizing and delivering cooling fluid to a fuel cell system component.

8. A process as set forth in claim 6 wherein the liquid cooling fluid comprises $CClF_2CClF_2$.

9. A process as set forth in claim 6 wherein the molecules further comprise a halide.

* * * * *